United States Patent [19]

Lenz

[11] Patent Number: 4,734,000
[45] Date of Patent: Mar. 29, 1988

[54] POWER DRAWBAR WRENCH

[75] Inventor: John O. Lenz, Coon Rapids, Minn.

[73] Assignee: Kurt Manufacturing Company, Inc., Minneapolis, Minn.

[21] Appl. No.: 23,794

[22] Filed: Mar. 9, 1987

[51] Int. Cl.$^4$ .................... B23C 5/26; B23B 31/10
[52] U.S. Cl. .................... 409/233; 408/239 A
[58] Field of Search .................... 409/231, 233; 408/239 R, 239 A, 238; 279/8

[56] References Cited

U.S. PATENT DOCUMENTS

| | | | |
|---|---|---|---|
| 3,481,248 | 12/1969 | Engstrom | 409/233 |
| 3,680,437 | 8/1972 | Cravens, Jr. | 409/233 |
| 3,753,383 | 8/1973 | Schmidt | 409/233 |
| 3,797,956 | 3/1974 | Bayer et al. | 408/35 |
| 3,823,642 | 7/1974 | Jerue | 409/233 |
| 3,898,911 | 8/1975 | DeCaussin | 409/233 |
| 4,075,927 | 2/1978 | Frazier | 409/233 |
| 4,382,730 | 5/1983 | Reinisch | 409/233 |
| 4,411,568 | 10/1983 | Rohm | 409/233 |
| 4,511,295 | 4/1985 | Razdobreev | 409/233 |
| 4,589,808 | 5/1986 | O'Connor | 409/233 |

OTHER PUBLICATIONS

Brochure illustrating "DoALL Power Drawbar" for 200 Series and 2000 CNC Mills (DoALL Industrial Supply).
Brochure illustrating "Metal Machine Automatic Power Drawbar" (U.S. Pat. No. 4,511,291).
Brochure illustrating "Quicktwist Pneumatic Drawbar" (Reinisch Products).

*Primary Examiner*—William R. Briggs
*Attorney, Agent, or Firm*—Kinney & Lange

[57] ABSTRACT

A power operated wrench for acuating the drawbars on machine tools, such as vertical spindle milling machines, which permits the operator to move a single handle, and after release of a safety interlock move a pneumatic wrench into position to engage the drawbar nut and either tighten or loosen the drawbar depending on the direction of motion of the operator handle. The mechanical operation permits the operator to rotate the operator handle in the same direction as would be done if the drawbar was being manually tightened or loosened, in order to tighten or loosen the drawbar under power. The safety interlock prevents movement of the power motor into engagement with the drawbar until the machine has been shut off.

15 Claims, 7 Drawing Figures

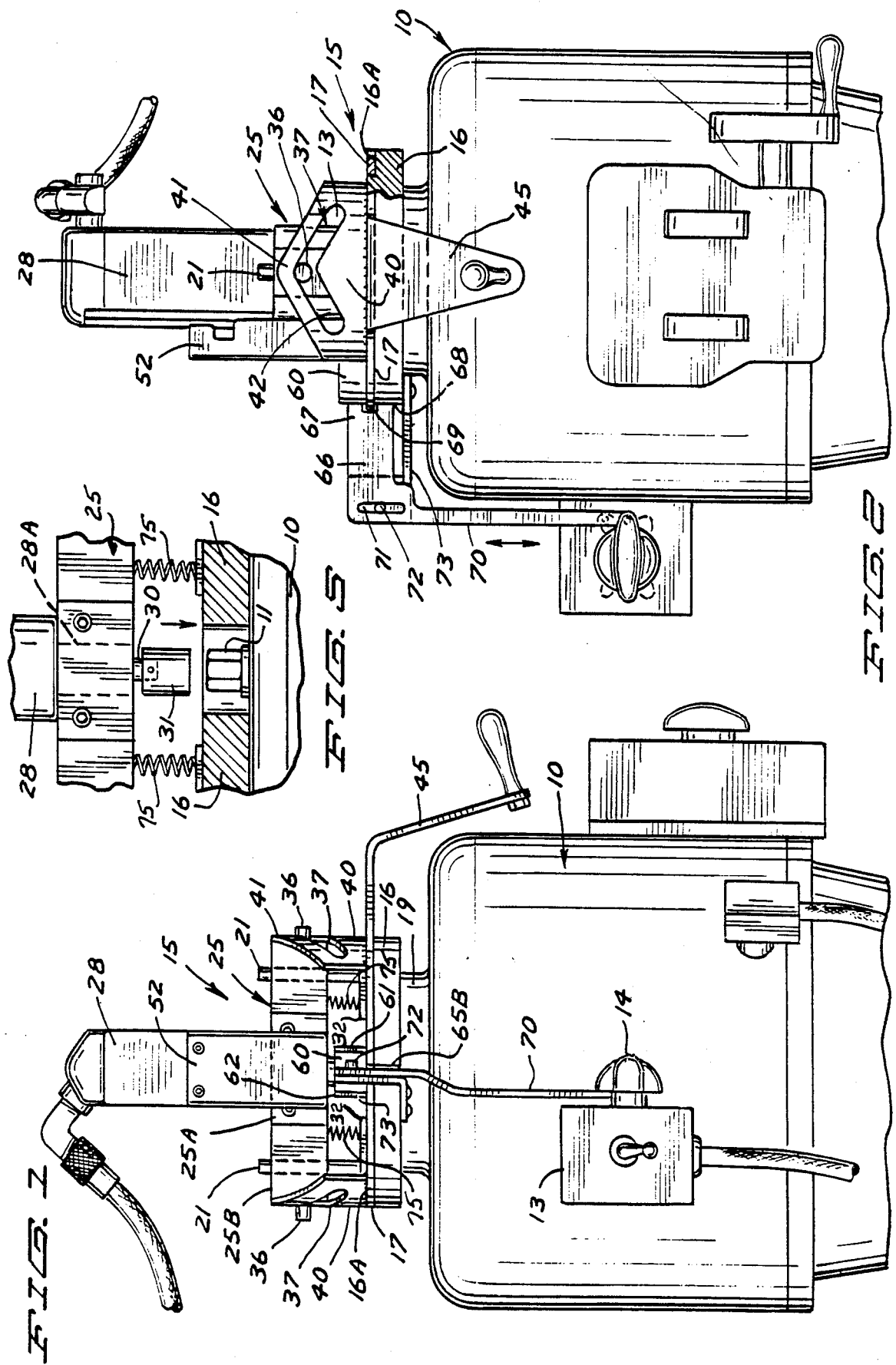

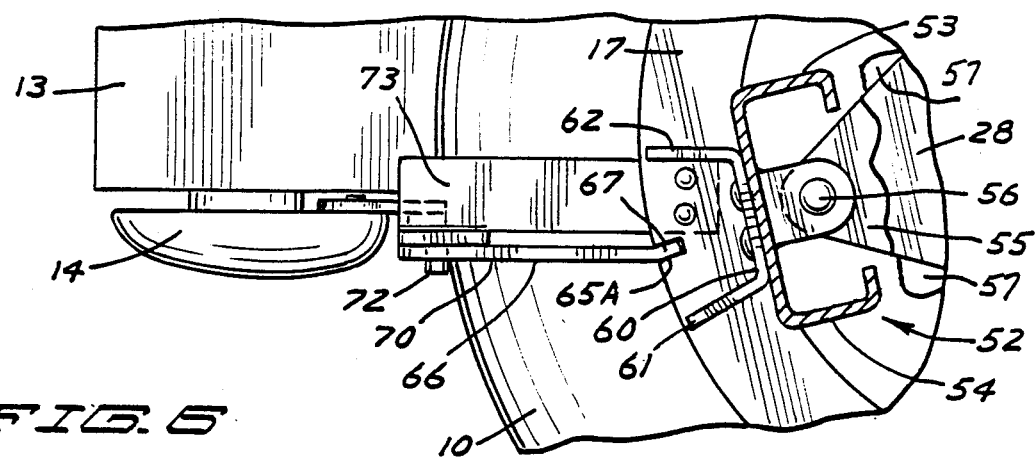
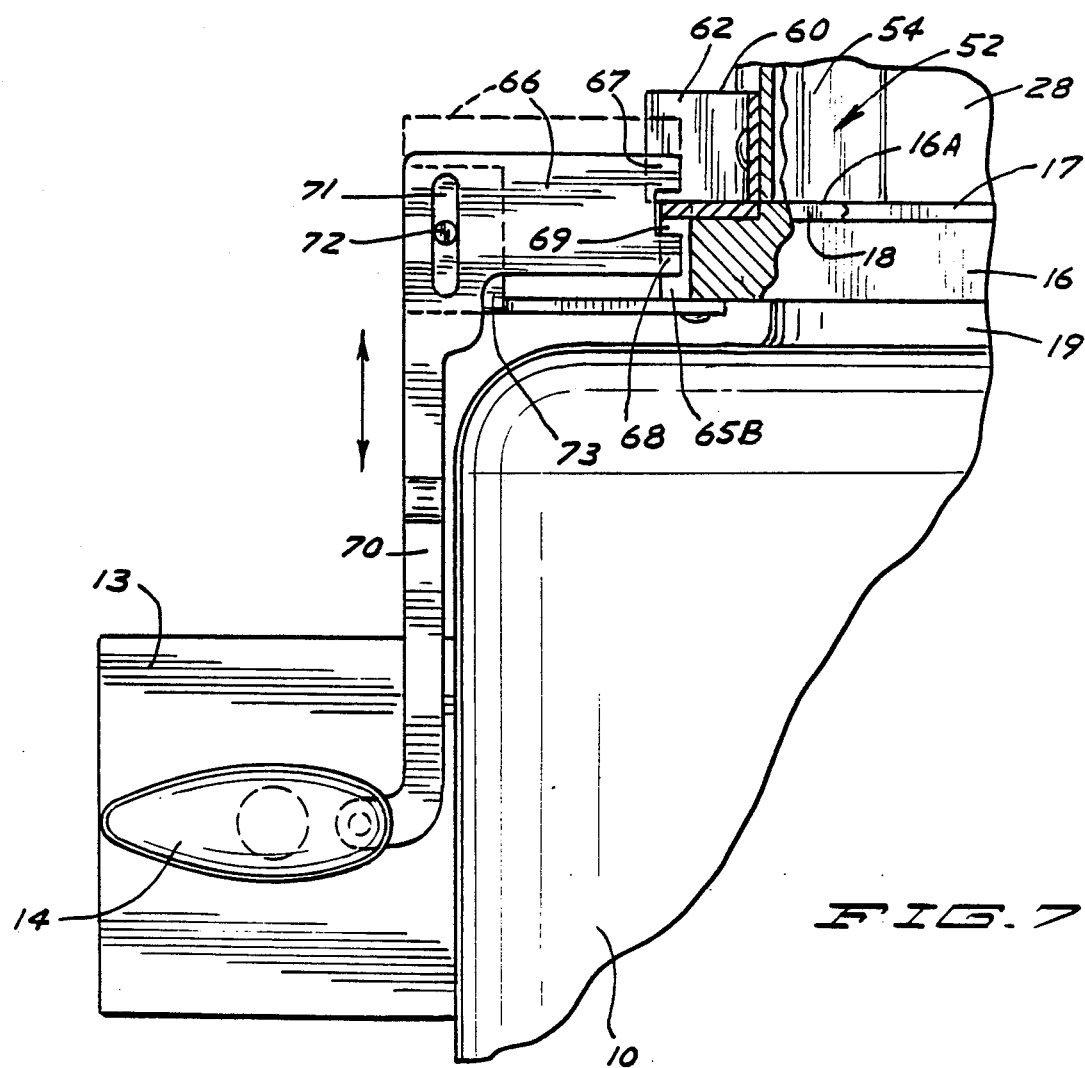

4,734,000

POWER DRAWBAR WRENCH

BACKGROUND OF THE INVENTION

1. Field of the Invention

The present invention relates to a power wrench for a machine tool drawbar.

2. Description of the Prior Art

A collet release mechanism for machine tools is shown in U.S. Pat. No. 4,511,295 which includes a pneumatic motor having a drive shaft that rotates a socket type wrench, and which is vertically slid up and down on guide posts by use of a pneumatic cylinder that is operated by movement of a control valve by an operator.

The operation using a valve and pneumatic cylinder is complicated, and does not give the operator any sense of movement as to whether the operator is tightening or loosening the drawbar. The operator has to make sure that the right valve button is pushed for operation.

Another type of pneumatically operated spindle wrench as shown in U.S. Pat. No. 4,382,730, which uses a standard wrench with a operate handle that operates directly against the switch on a pneumatic motor that is part of a normal pneumatic wrench. This device requires swinging the motor into position over the drawbar.

Various other power operated drawbars are advanced, but none which are simple, mechanically controlled attachments that can go onto an existing machine tool, such as a milling machine, or build in, and provide manual operation and also provide the sense of direction by rotating the actuator in opposite directions for locking (tightening) or unlocking (loosening) the drawbar.

For example, U.S. Pat. No. 3,481,248 shows a drawbar that has a power motor directly installed, as does U.S. Pat. No. 3,898,911. Additionally, the other patents that were cited in U.S. Pat. No. 4,511,295 illustrate the state-of-the-art.

BRIEF DESCRIPTION OF THE DRAWINGS

FIG. 1 is a side elevational view of a milling machine head having a vertical spindle and having a drawbar operator made according to the present invention installed thereon;

FIG. 2 is a view taken at 90° from the view of FIG. 1 showing a side thereof;

FIG. 5 is a fragmentary sectional view showing the drawbar and drive socket relationship;

FIG. 6 is a fragmentary enlarged plan view of a motor switch control section of the present invention; and FIG. 7 is a fragmentary side view of the members shown in FIG. 6, with parts in section and parts blocking away.

DETAILED DESCRIPTION OF THE PREFERRED EMBODIMENTS

Figure 3:
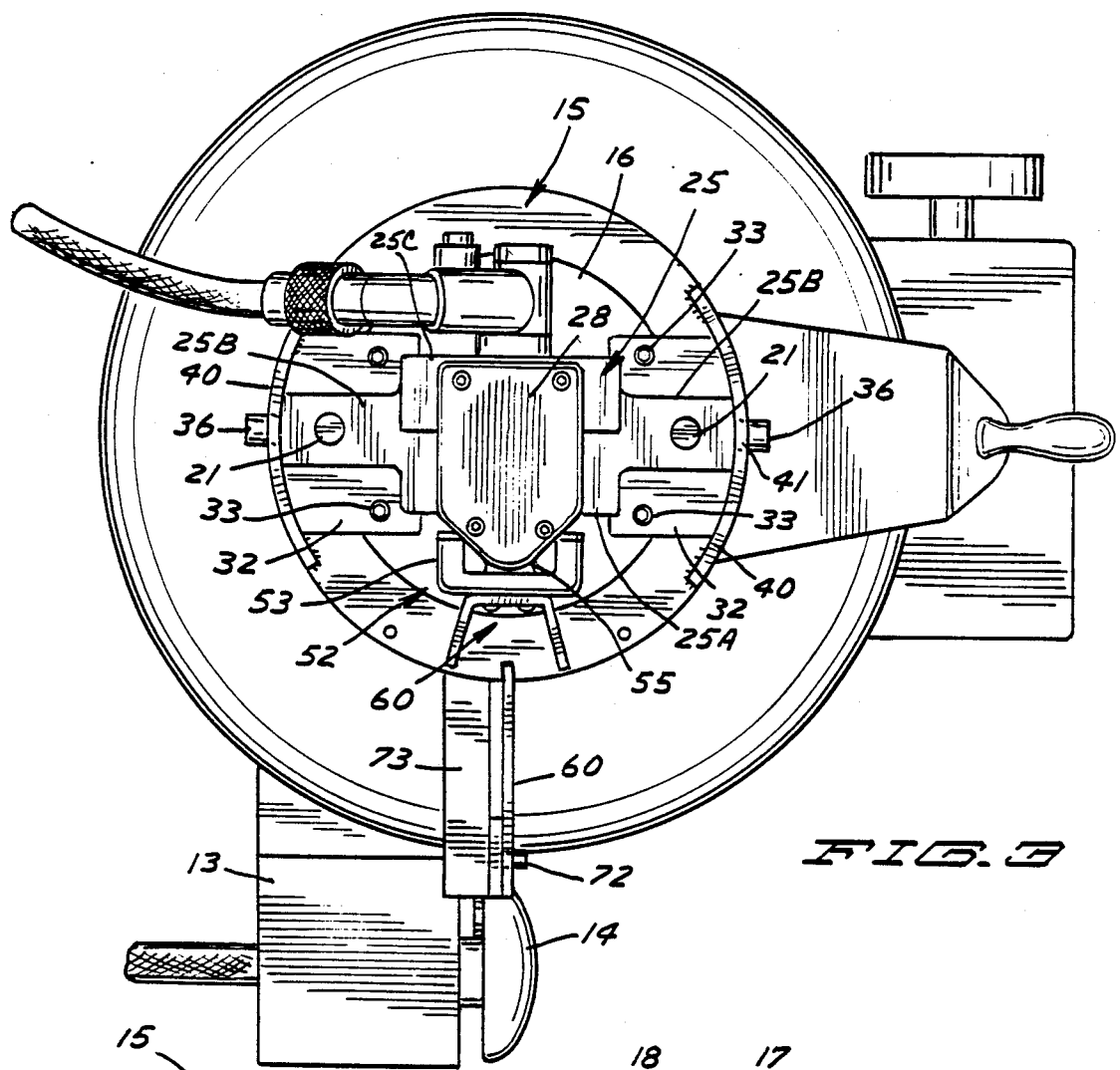
FIG. 3 is a top plan view of the device of FIG. 1.

A milling machine head (a machine tool) is shown generally at 10, and comprises a standard head of a standard Bridgeport milling machine. The machine tool 10 has a vertical drawbar of conventional design, which is indicated only schematically at 11 in FIG. 5, and protrudes up above the top of the milling machine head 10 with a hex-shaped end in a normal manner. The machine tool, of course, has a drive motor inside the head 10 that rotates the spindle under power when a control switch indicated generally at 13 is turned on. The switch 13 is shown in FIG. 2 in its off position, and the handle 14 can be rotated upwardly (clockwise) to drive the spindle in one direction, and downwardly (counterclockwise) as shown in dotted lines to drive the spindle 11 in the opposite direction. The positioning of the switch handle or lever 14 in its centered position is important in describing the mechanical safety interlock that is used with the present invention.

The milling machine 10 has normal controls for operation and when the tool driven by the drawbar is to be changed, the drawbar is loosened while the chuck is held from rotating, and the power drawbar wrench of the present invention indicated generally at 15 is used for permitting the operators to manually actuate a separate motor or power wrench to engage the drawbar, and to tighten or loosen the drawbar.

The power wrench comprises a mounting block or plate indicated generally at 16 that is fixed directly to the top surface of a boss 19 that extends upwardly from the head of the machine tool 10. Block 16 forms a base for rotatably mounting the drawbar wrench actuating elements. As can be seen in section FIG. 2, the block 16 has an outer annular support ledge or flange 16A thereon which provides an annular shoulder on which a rotating actuator ring indicated generally at 17 and shown in section on the right side of FIG. 2 is mounted. As also can be seen in FIG. 4, the support flange 16A surrounds and defines a central guide boss 18 forming part of the mounting member 16 around which ring 17 fits.

The actuator ring 17 has a pair of recess or guide slots indicated generally at 20, 20, on its internal diameter (see FIG. 4) that are centered 180° apart and extend for a portion of the arc around the center boss 18. These slots 20 have their inner side open and are positioned to fit around the outside of and receive a pair of vertical guide pins 21 which are fixed to the mounting block 16 and extend upwardly from the block 16. The actuator ring 17 will rotate past these pins 21, 21 as guided by the center boss 18 of the mounting block 16, but rotation of the ring 17 will be stopped at the ends of the guide slots indicated at 21A and 21B, respectively so that the rotation of the actuator ring 17 is restrained and guided.

Figure 4:
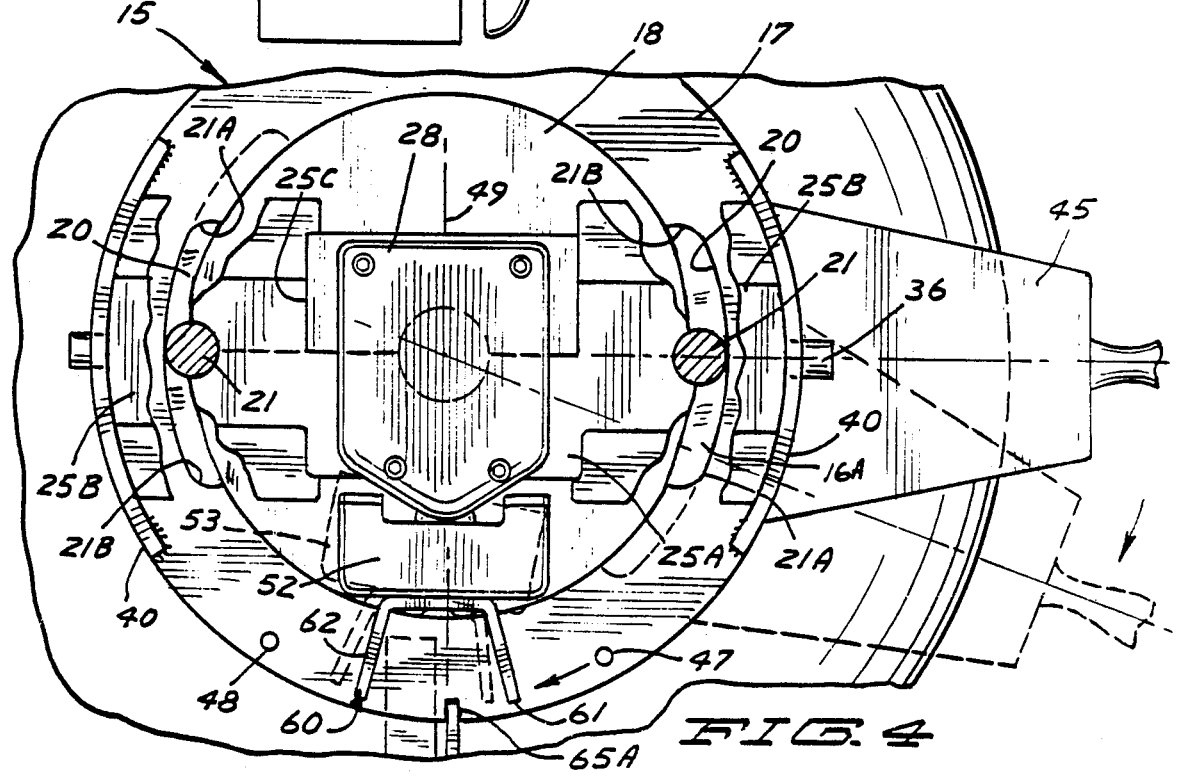
FIG. 4 is an enlarged fragmentary top view with parts in section and parts broken away.

A guide block 25 extends laterally across and above the boss 18, as can be seen in FIGS. 3 and 4, and has a center portion 25A and ears 25B extending in opposite direction from the center block 25A. The ears 25B have openings or aperatures that are slidably mounted onto the guide pins 21. The guide block 25 has a center portion 25A that is clamped directly to the output shaft housing 28A of a pneumatic motor 28 of normal design which is commercially available. The clamping is done with a clamp section 25C that is part of the center block 25A and is clamped in place with suitable cap screws. The pneumatic motor 28 has an output shaft 30 that is shown in FIG. 5. The output shaft 30 extends downwardly below the center portion of the block 25 and has a socket 31 drivably mounted thereon which, when the guide block 25 is supported on the pins 21, is axially aligned with the hex end 11 of the machine tool drawbar.

The actuator ring 17 is held down and also is guided by a pair of flat holddown plates 32, 32 that underlie the ears 25B on the guide block 25, and are fixed to the center boss 18 of block 16 with suitable cap screws 33 as shown.

The motor 28 can be adjusted in position by loosening the cap screws that hold the clamp member 25C against the main part of the guide block 25. As can be seen, the clamp member 25C is recessed into the center portion of the guide block, and define an opening in which the motor can be clamped.

Each of the ears 25B of the guide block 25 have a cam follower roller ear 36 mounted thereon and extending laterally outwardly therefrom. The cam follower ears 36 in turn are mounted in cam slots 37 that are formed in upstanding cam flanges 40 that are fixed on opposite sides of the rotating actuator ring 17. The cam flanges 40 are made to extend only part way around the actuator ring 17, and the center portions of the cam flanges 40 extend upwardly from the level at their outer edges into a peak indicated generally at 41. The cam slots 37 have a center part at the peak that is the normal or rest position for the cam follower ears 36. The cam slots also each have first cam slot portions 42 that taper downwardly from the center peak in a first rotational direction and a second cam slot portion 43 that tapers downwardly from the center in an opposite direction and that will be operable to move the cam follower ears 36 and thus the block 25 downwardly along pins 21 when the ring 17 is rotated around boss 18 in either direction from a rest or reference position using a manual handle 45. The ring 17 can be moved a limited amount in both directions of rotation from its centered position shown in FIG. 2. It can be seen that whenever the handle 45 is moved to rotate the actuator ring 17, the cam follower ears 36 will be forced by the respective cam slot portions 42 or 43 to move downwardly toward the milling machine head 10. The block 25 will be prevented from rotating with the ring 17 by the guide pins 21.

The actuator ring 17 also has a pair of spaced, upright switch actuator pins 47 and 48 respectively, that are centered on (positioned on opposite sides of) an axis 49 shown in FIG. 4 which is 90° to the axis of the cam follower ears 36. The pins 47 and 48 are spaced equal distances on opposite sides of the plane that bisects the motor 28 and lies on axis 49, which plane is also perpendicular to the axis of the cam follower ears 36.

In order to power the air motor 28, a pivotally mounted switch block 52 comprising a channel shaped member that has legs 53 and 54, respectively (see FIGS. 3, 4, 6 and 7), is mounted onto a suitable bracket 55 on the drive motor 28 (see FIG. 6) with a pivot pin 56, that is parallel to the axis of the drive motor 28. The switch block 52 carries a separate switch actuator channel 60 that has legs 61 and 62, respectively, that face in opposite direction from legs 53 and 54. The switch actuator channel 60 is centered on the plane that passes through the center axis of the drive motor and lies on axis 49. The legs 61 and 62 of the switch actuator channel 60 extending on opposite sides of this plane represented by axis 49 are in line with and adjacent to one of the pins 47 and 48, respectively. The actuation of the reversing control switch for the drive motor 28 is achieved by pivoting the switch block 52 so that one of the legs 53 or 54 will move inwardly toward the motor as shown in dotted lines in FIG. 4 (there leg 53 has moved in) about the pivot axis of the pin 56. This movement will actuate the provided standard switch on the wrench motor 28 to effect an air drive in first and second directions, respectively. This will rotate the socket 31 in the correct direction for either loosening or tightening the drawbar as will be explained. Spring loaded switch buttons or actuators are shown illustratively at 57 in FIG. 6 for illustrative purposes.

Unwanted and unsafe rotation of the actuator ring 17 is prevented with a safety interlock that locks the actuator ring 17 from rotation except when the milling machine control switch button 14 and switch 13 are in their off positions as shown in FIG. 2. The socket 31 must not be engaged with the drawbar when the drawbar is rotating. In the form shown, a mechanical interlock is made, and in order to achieve this interlock, the ring 17 has an axial extending notch 65A in its edge, and the mounting block 16 has an aligning notch 65B in its periphery so that the notches shown at 65A and 65B are aligning when the actuator ring 17 is in its centered or off position as shown in FIGS. 2 and 6.

With the main switch handle 14 in its centered or off position, as shown in FIG. 2, a block or latch plate 66, which has a pair of edge lugs 67 and 68, respectively, is in a position so that a space or open area 69 between the lugs 67 and 68 aligns with the plane of the actuator ring 17, so that the actuator ring 17 can be rotated. However, when the main switch 14 is moved to either one of its dotted line positions shown in FIG. 2 so that the switch handle 14 pushes on an actuator link 70 that moves the block plate 66 up or down, as guided by a slot 71 and a pin 72 that in turn is mounted on a bracket 73, the respective lug 67 or 68 will be positioned partially in line with the plane of the actuator ring 17, and partly in line with the support block 16 to prevent rotation of the actuator ring 17. This will insure that the actuator ring 17 cannot be rotated to move the socket 31 to position engaging the drawbar head 11 unless the main machine tool motor that drives the drawbar and spindle has been turned off.

The safety interlock can be made electronic, or even solenoid operated. For example, a solenoid plunger could be actuated to prevent rotation of the actuator ring 17 unless the switch 13 for the milling machine 10 was in an off position. A motion sensor may be used to sense when the machine spindle has stopped.

As shown in FIG. 4, when the hand lever 45 is rotated in a clockwise direction, which would be the direction for tightening a righthand thread, and is moved to its dotted line position shown in FIG. 4, the cam follower ears 36 will be moved downwardly along the cam slot portions 43 of the two cam flanges 40, causing the pneumatic motor 28 to be moved downwardly as guided by the guide block 25 and pins 21. This will cause the socket 31 to engage the head of drawbar 11. After the socket has engaged the head 11 the pin 47 will strike the leg 61 of the switch actuator channel 60 as shown in dotted lines, pivoting the switch block 52 and causing the switch block to operate the standard, existing switch (59) to the pneumatic motor 28 and turn the motor on and for rotation in a direction to tighten the drawbar. When the actuator ring 17 is released, the block 25 is urged upwardly by springs 75 that act between the guide tabs 32 and the underside of block 25. The springs are of sufficient strength to tend to return the cam ears 36 to the centered or rest position when the handle 45 is released. Also, the standard switch for motor 28 is spring loaded to its off position, so when the actuator ring 17 starts to return to center, the motor 25 will turn off as soon as the pin 47 moves away from leg 61 of the switch actuator 60. The motor 28 turns off and switch block 52 becomes centered.

When the handle 45 is moved in an opposite direction from rest, that is, in counterclockwise direction as shown in FIG. 4 from its centered or rest position, which again can occur only when the main switch 13 and any other safety interlock is properly positioned, the cam follower ears 36 will be moved downwardly along the cam slot portions 42, and the pin 48 on actuator ring 17 will strike the leg 62 of the switch actuator channel 60 causing the switch block 52 to pivot in an opposite direction from its centered position shown in FIGS. 4 and 6 to cause the motor 28 to be powered to rotate in an opposite direction and to loosen the drawbar of the machine tool. This action gives the operator the sense of feel of operating a righthand thread for either loosening or tightening the drawbar, and makes the operation feel natural and comfortable for use. The springs 75 keep the block 25 in its neutral position except when the handle 45 is being manually operated.

The mechanical operation is fairly simple, the apparatus is compact and easily operated, and thus is low cost. It provides for a quick simple power drawbar operation that provides a better tactile feel of the tightening and loosening features for a drawbar.

Although the present invention has been described with reference to preferred embodiments, workers skilled in the art will recognize that changes may be made in form and detail without departing from the spirit and scope of the invention.

What is claimed is:

1. A drawbar operating wrench for mounting onto a machine tool and for centrally tightening of the drawbar thereof, which drawbar has one end which protrudes from the machine tool and is adapted to be rotated, said drawbar operating wrench comprising:
   a mounting block adapted for being mounted on the machine tool adjacent the one end of the drawbar;
   an actuator member mounted on the mounting block for rotational movement centered on the axis of said drawbar;
   a motor slideably mounted relative to said block and being guided for movement generally parallel to the axis of the drawbar, said motor being moveable between first and second positions, said motor in its second position operatively engaging said drawbar for rotating said drawbar and in the first position clearing said drawbar;
   means operatively connecting said motor and said actuator member so that upon movement of said actuator member the motor is moved in a selected direction from a reference position and is moved toward its second position and thus toward said drawbar;
   interlock means coupled to said actuator member to prevent movement of said actuator member when the machine tool is powered; and
   means coupled to said actuator member for energizing the motor after the actuator member has moved the motor to its second position engaging said drawbar.

2. The drawbar wrench of claim 1 wherein said actuator member comprises a cam actuator rotatably mounted about the axis of the drawbar of a machine tool on which the drawbar wrench is mounted, and a cam follower operatively connected to said motor whereby movement of said actuator member causes said cam to move said cam follower and said motor toward said drawbar.

3. The drawbar wrench as specified in claim 2 wherein said actuator member comprises a ring rotatably mounted relative to said mounting block, and said actuator member being moveable in two rotational directions from a centered position, said actuator member having means thereon for moving said motor toward said drawbar in either direction of movement of the actuator member from a centered position.

4. The drawbar wrench as specified in claim 3 and means for selectively energizing said motor to rotate in opposite directions after the actuator member has been rotated in a corresponding direction from its centered position.

5. An attachment for a machine tool having a drawbar with at least one end of the drawbar adjacent a portion of the machine tool and positioned for rotation to tighten and loosen the drawbar, comprising;
   a first support adapted to be mounted to said machine tool in position adjacent the one portion of a drawbar on the machine tool on which the first support is mounted;
   a motor support having means for mounting a motor thereon;
   means to slideably guide said motor support on said first support for movement toward and away from a drawbar on a machine tool on which the first support is mounted; and
   actuator means rotatably mounted on the first support and coupled to said motor support for moving said motor support toward said drawbar to engage a motor mounted on the motor support with a drawbar on a machine tool on which the first support is mounted, and including means for operating a motor mounted on the motor support when the motor support has been moved to a second position adjacent such a drawbar upon movement of said actuator means.

6. The attachment as specified in claim 5 and means acting between the first support and the motor support for urging the motor support to a reference position.

7. The attachment of claim 6 and a motor mounted on the motor support on an axis parallel to an axis of a drawbar of a machine tool on which the first support is mounted and adapted to engage the one end of such drawbar as the motor support moves toward such drawbar and having a motor switch thereon, said actuator means including means for operating said motor switch when the actuator means is rotated in opposite directions from its reference position, subsequent to engagement of the motor with such drawbar.

8. The attachment of claim 5 wherein said actuator means comprises a rotatable member mounted on said first support and movable from a centered position in opposite directions about an axis of the drawbar of a machine tool on which the first support is mounted.

9. The attachment as specified in claim 8 and safety interlock means coupled to a control on a machine tool on which the first support is mounted to prevent movement of said actuator means when such a machine tool is in an operable condition.

10. The attachment as specified in claim 5 wherein said actuator means comprises a ring member, said first support having a central boss and a shoulder on which said ring member is rotatably supported, said actuator means further having means defining a cam track thereon having first and second cam track portions, a cam follower mounted on said motor support engaging said cam track, said first and second cam track portions causing movement of said motor support toward said drawbar upon rotation of the ring member in either direction of rotation from a centered position.

11. The attachment of claim 10 wherein said cam track comprises two part annular cam flanges on opposite sides of the ring member, said cam flanges being positioned to extend from the ring member generally parallel to the axis of movement of the ring member, said motor support being positioned between the cam flanges, the cam followers comprising cam roller ears extending from the motor support to engage the cam slats in the cam flanges.

12. The attachment as specified in claim 8, and switch actuator means on said ring member adapted to engage a switch block member on said motor to energize said motor, said motor having means to permit energization in two directions of rotation, and said motor being energized in opposite direction of rotation by said switch actuator means upon rotation of said ring member from its centered position.

13. The attachment of claim 12 and means to limit rotational movement of the rotating member in opposite directions from a centered position.

14. The apparatus of claim 13 and guide pin means on the first support extending generally parallel to the axis of the drawbar and said motor support being slidably guided on said guide pins.

15. An attachment for a machine tool having a drawbar with at least one end of the drawbar adjacent a portion of such machine tool and positioned for rotation to tighten and loosen such drawbar, comprising:

first means for mounting on a machine tool adjacent an end of a drawbar;

power actuator means operable for rotatably driving a drawbar on such machine tool to tighten or loosen such drawbar;

means for guiding the power actuator means between first and second positions engaged with and disengaged from such drawbar, respectively;

second manual actuator means movably mounted on an axis on the first means and coupled to the power actuator means to cause movement of the power actuator means between its first and second positions where the second manual actuator means is moved about its axis in either direction; and means responsive to movement of the second manual actuator means to cause the power actuator means to be rotated in the same direction of rotation as the movement direction of the manual actuator means.

* * * * *